(12) United States Patent
Nie et al.

(10) Patent No.: US 10,770,844 B2
(45) Date of Patent: Sep. 8, 2020

(54) LEAKAGE CURRENT PROTECTION DEVICE FOR POWER PLUG

(71) Applicant: Chengli Li, Suzhou (CN)

(72) Inventors: Shengyun Nie, Suzhou (CN); Chengli Li, Suzhou (CN)

(73) Assignee: Chengli LI, Suzhou (CN)

( * ) Notice: Subject to any disclaimer, the term of this patent is extended or adjusted under 35 U.S.C. 154(b) by 386 days.

(21) Appl. No.: 15/808,839

(22) Filed: Nov. 9, 2017

(65) Prior Publication Data

US 2018/0166833 A1 Jun. 14, 2018

Related U.S. Application Data

(63) Continuation-in-part of application No. 15/592,674, filed on May 11, 2017, now Pat. No. 10,170,265.

(30) Foreign Application Priority Data

Dec. 14, 2016 (CN) .......................... 2016 1 1156527
Dec. 14, 2016 (CN) .................... 2016 2 1373486 U
(Continued)

(51) Int. Cl.
*H01R 13/713* (2006.01)
*H01R 13/66* (2006.01)
(Continued)

(52) U.S. Cl.
CPC ......... *H01R 13/7135* (2013.01); *H01H 73/44* (2013.01); *H01H 83/144* (2013.01);
(Continued)

(58) Field of Classification Search
CPC .............. H01R 13/6683; H01R 13/506; H01R 13/5816; H01R 13/631; H01R 13/7135;
(Continued)

(56) References Cited

U.S. PATENT DOCUMENTS 3,761,774 A * 9/1973 Laughinghouse ..... H01H 13/08
361/45
4,001,647 A 1/1977 Klein et al.
(Continued)

FOREIGN PATENT DOCUMENTS

CA 2512785 A1 * 9/2006 ............. H01H 83/04
CN 2010-D58822 * 12/2010

*Primary Examiner* — Mohamad A Musleh
(74) *Attorney, Agent, or Firm* — Chen Yoshimura LLP (57) ABSTRACT

A leakage current protection plug includes a body formed by a top cover and a base, a moving assembly disposed in the body, and output wires. The moving assembly includes a control circuit board, and a detector assembly and a trip assembly disposed on the control circuit board, wherein power input insertion plates and power output moving contact arms are assembled with the moving assembly. Each output moving contact arm is formed integrally and fixed to the detector assembly, and the output ends of the output moving contact arms are directly connected to the output conductor wires. The device has a simple overall structure and can be reliably assembled. By using integrally formed output moving contact arms to directly couple the input and output, it improves the accuracy of the leakage current detection parameters, reduces internal transfers and solder points, and reduces the size and cost of the plug.

12 Claims, 6 Drawing Sheets

(30) Foreign Application Priority Data

Aug. 14, 2017 (CN) .......................... 2017 1 0689854
Aug. 14, 2017 (CN) ..................... 2017 2 1009050 U

(51) Int. Cl.

| | |
|---|---|
| H02H 1/00 | (2006.01) |
| H01R 13/58 | (2006.01) |
| H01R 13/631 | (2006.01) |
| H01R 13/506 | (2006.01) |
| H02H 3/16 | (2006.01) |
| H01H 83/14 | (2006.01) |
| H01H 73/44 | (2006.01) |
| H01H 83/04 | (2006.01) |
| H02H 3/33 | (2006.01) |
| H01H 71/58 | (2006.01) |

(52) U.S. Cl.

CPC ....... *H01R 13/506* (2013.01); *H01R 13/5816* (2013.01); *H01R 13/631* (2013.01); *H01R 13/6683* (2013.01); *H02H 1/0007* (2013.01); *H02H 3/16* (2013.01); *H01H 71/58* (2013.01); *H01H 83/04* (2013.01); *H02H 3/334* (2013.01)

(58) Field of Classification Search

CPC ...... H01H 73/44; H01H 83/144; H01H 71/58; H01H 83/04; H02H 1/0007; H02H 3/16; H02H 3/334

See application file for complete search history.

(56) References Cited

U.S. PATENT DOCUMENTS

| | | | |
|---|---|---|---|
| 4,001,652 A | 1/1977 | Klein et al. | |
| 4,010,432 A | 3/1977 | Klein et al. | |
| D270,628 S | 9/1983 | Bobrovniczky | |
| 4,409,574 A | 10/1983 | Misencik et al. | |
| 5,394,289 A * | 2/1995 | Yao | H01H 71/122 337/239 |
| 5,661,623 A | 8/1997 | McDonald et al. | |
| 5,862,029 A | 1/1999 | Nicol | |
| D434,010 S | 11/2000 | Stekelenburg | |
| D451,481 S | 12/2001 | MacKay | |
| D473,188 S | 4/2003 | Cheah et al. | |
| D511,468 S | 11/2005 | Aromin | |
| D511,469 S | 11/2005 | Aromin | |
| D562,766 S | 2/2008 | Yang | |
| 7,414,499 B2 | 8/2008 | Germain | |
| D579,881 S | 11/2008 | Aromin | |
| 7,621,765 B1 | 11/2009 | Wu | |
| 7,753,721 B1 | 7/2010 | Wu | |
| D633,869 S | 3/2011 | Aromin et al. | |
| D635,937 S | 4/2011 | Aromin et al. | |
| 8,390,404 B2 | 3/2013 | Zou | |
| 8,824,110 B2 | 9/2014 | Zou | |
| D727,185 S | 4/2015 | Aromin | |
| 9,036,320 B1 | 5/2015 | Elberbaum | |
| D742,831 S | 11/2015 | Yu et al. | |
| 9,713,273 B2 | 7/2017 | Li et al. | |
| 9,825,415 B1 | 11/2017 | Lin et al. | |
| 9,876,345 B2 | 1/2018 | Weeks et al. | |
| 2002/0003686 A1 | 1/2002 | Disalvo | |
| 2002/0154488 A1* | 10/2002 | Leopold | H01H 71/0207 361/728 |
| 2003/0016477 A1 | 1/2003 | Li | |
| 2004/0027740 A1 | 2/2004 | Huang et al. | |
| 2006/0061924 A1 | 3/2006 | Zhang | |
| 2007/0279162 A1* | 12/2007 | Zhang | H01H 83/04 335/21 |
| 2008/0094764 A1 | 4/2008 | Zhang et al. | |
| 2008/0135274 A1 | 6/2008 | Peck | |
| 2009/0184787 A1 | 7/2009 | Weeks et al. | |
| 2010/0046128 A1 | 2/2010 | Wang et al. | |
| 2012/0147570 A1 | 6/2012 | Yamazaki | |
| 2013/0100560 A1* | 4/2013 | Zou | H01R 13/7135 361/42 |
| 2013/0277086 A1 | 10/2013 | Rohmer | |
| 2014/0139955 A1* | 5/2014 | Ye | H01R 13/7135 361/42 |
| 2014/0140010 A1 | 5/2014 | Chan et al. | |
| 2014/0177169 A1 | 6/2014 | Restrepo et al. | |
| 2014/0192492 A1 | 7/2014 | Wojcik et al. | |
| 2014/0364014 A1 | 12/2014 | Kawamoto et al. | |
| 2015/0116872 A1* | 4/2015 | Li | H02H 1/0015 361/42 |
| 2015/0200533 A1 | 7/2015 | Simonin | |
| 2015/0327380 A1 | 11/2015 | Li et al. | |
| 2017/0244206 A1 | 8/2017 | Jiang | |
| 2017/0244237 A1 | 8/2017 | Weeks et al. | |
| 2018/0145500 A1 | 5/2018 | Weeks et al. | |
| 2018/0166242 A1 | 6/2018 | Li et al. | |
| 2018/0166833 A1 | 6/2018 | Nie et al. | |
| 2019/0199047 A1 | 6/2019 | Zhang | |

* cited by examiner

LEAKAGE CURRENT PROTECTION DEVICE FOR POWER PLUG

BACKGROUND OF THE INVENTION

Field of the Invention

This invention relates to electrical apparatus, and in particular, it relates to a leakage current protection device for a power plug.

Description of Related Art

With the wide use of home electrical appliances, the safety of the appliances is important. Currently, many home electrical appliances are equipped with leakage current protection plug at the power input end. However, conventional leakage current protection plugs have the following problems: The detector coil inside the leakage current protection plugs are not effectively fixed, so wobbling of the detector coil can cause the leakage current detection parameters to drift, which compromises reliability. Further, conventional leakage current protection plugs have complex internal wiring (typically, transfer wires are provided between moving contact terminals and output wires and pass through the detector coil), with increased number of transfers and solder points. This causes internal temperature of the product to rise, reduces its reliability, and makes it difficulty to manufacture. Also, conventional leakage current protection plugs have relatively large sizes, and when plugged into a wall outlet or power strip, take up much space, reducing the utilization efficiency of the outlet and also increasing cost.

SUMMARY

To solve the above problems, the present invention provides a leakage current projection plug, which securely fixes the detector coils inside the plug, thereby increasing the accuracy of the leakage current detection parameters and reducing the number of transfers and solder points. These improve the reliability of the plug product. Also, improved design and layout of the internal components reduce the size of the product and lowers cost.

In one aspect, the present invention provides a leakage current protection plug which includes: a body formed by a top cover and a base; a moving assembly disposed in the body, which includes a control circuit board and a detector assembly and a trip assembly disposed on the control circuit board; two input insertion plates and two output moving contact arms assembled with the moving assembly; and output conductor wires, wherein each output moving contact arm is formed integrally and fixed to the detector assembly, and wherein output ends of the output moving contact arms are directly connected to the respective output conductor wires.

The invention further includes the following preferred embodiments:

In some embodiment, the detector assembly includes a detector coil box, and a detector coil and at lease one metal plate disposed inside the detector coil box, and a detector coil cover which covers and fixes the detector coil and the metal plate, wherein the detector coil box defines a through hole for allowing the output moving contact arms to pass through, and wherein the output ends of the output moving contact arms pass through the through hole to be connected to the output conductor wires.

In some embodiment, the detector coil box, the detector coil, the metal plate, and the detector coil cover are affixed to each other by an adhesive.

In some embodiment, the device further includes a positioning structure for the output moving contact arms and the detector coil box, the positioning structure including a positioning hole or a positioning post on an assembly section of each output moving contact arm, and corresponding positioning posts or positioning holes on the detector coil box.

In some embodiment, the device further includes a moving contact cover for clamping the assembly sections of the output moving contact arms between the moving contact cover and the detector coil box, wherein the moving contact cover includes through holes which cooperate with the positioning posts of the detector coil box, and includes a positioning protrusion which is inserted into a corresponding slot on the detector coil box.

In some embodiment, the moving contact cover further includes positioning hooks which are inserted into corresponding mounting holes on the control circuit board.

In some embodiment, the trip assembly includes a trip coil frame, a trip plunger, and a trip spring, wherein the trip coil frame defines slots for accommodating the input insertion plates.

In some embodiment, the trip coil frame further includes a mounting plate cooperating with the detector coil box, wherein free sections of the output moving contact arms pass though position restriction slots on the mounting plate or the detector coil box.

In some embodiment, the movement assembly further includes a varistor, and wherein the trip coil frame further includes pin-receiving holes for receiving pins of the varistor.

In some embodiment, the top cover and the base are positioned with respect to each other via a snap structure and are fastened to each other by a fastening member, wherein the snap structure includes snap hooks or snap slots on the top cover and corresponding snap slots or snap hooks on the base.

In some embodiment, the device further includes a cable relief which covers a part of the output wires, wherein the cable relief is affixed to a fastening slot of the body.

Embodiments of the present invention not only achieve manual testing of the shield line, they can also automatically detect the shield line open circuit condition during use of the device, thereby improving safety. Embodiments of the invention have the additional advantage of simple circuitry and low cost.

BRIEF DESCRIPTION OF THE DRAWINGS

The following drawings are used to describe the embodiments.

DETAILED DESCRIPTION OF PREFERRED EMBODIMENTS

Embodiments of the invention are described below with reference to the drawings. The drawings illustrate specific embodiment that can achieve the goals of the present invention. The illustrated embodiments are not intended to show all possible embodiments of the invention. Also, directional terms used in the following descriptions, such as up, down, top, bottom, etc. are not absolute but are relative to the arrangements of the components in each drawing. When the components change positions, the directional terms should be changed accordingly.

Figure 1:
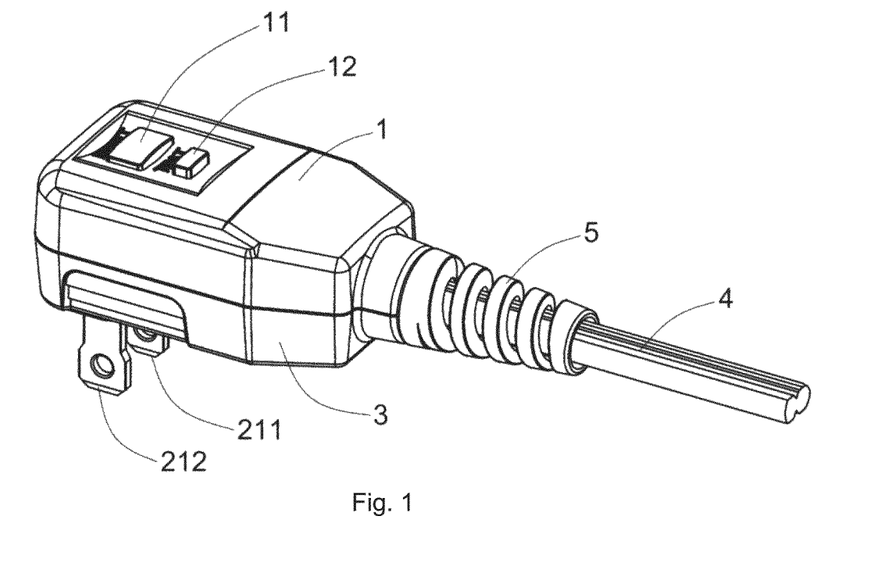
FIG. 1 is an exterior view of a leakage current protection plug according to embodiments of the present invention.
Figure 2:
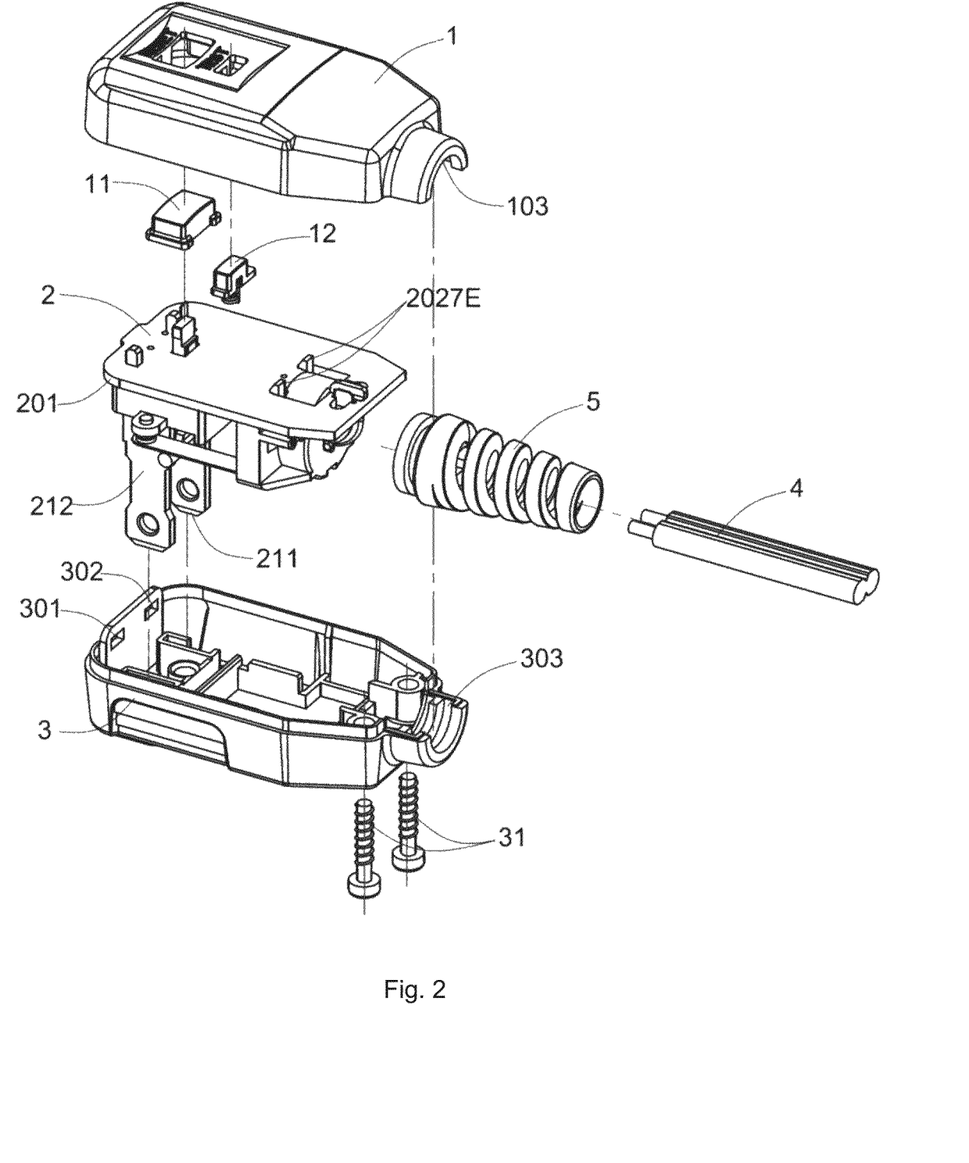
FIG. 2 is an exploded view of the leakage current protection plug of FIG. 1.
Figure 3:
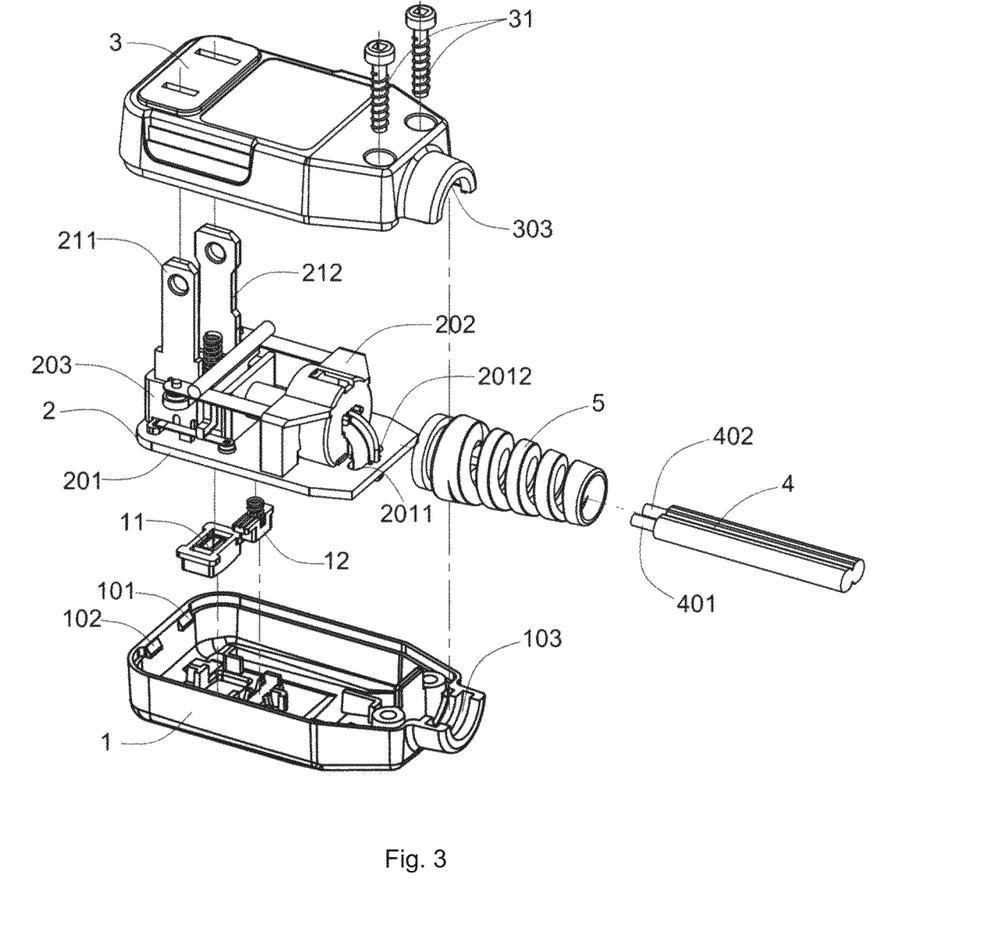
FIG. 3 is an upside-down exploded view of the leakage current protection plug of FIG. 1.
Figure 4:
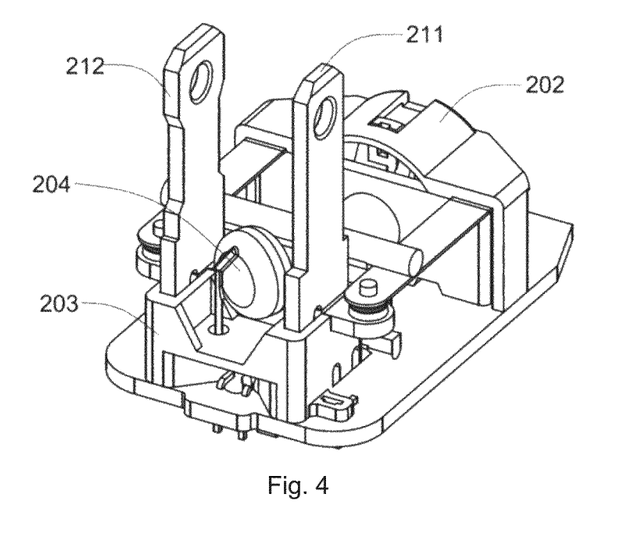
FIG. 4 is perspective view of the movement assembly which is assembled with input insertion plates and output moving contact arms.
Figure 5:
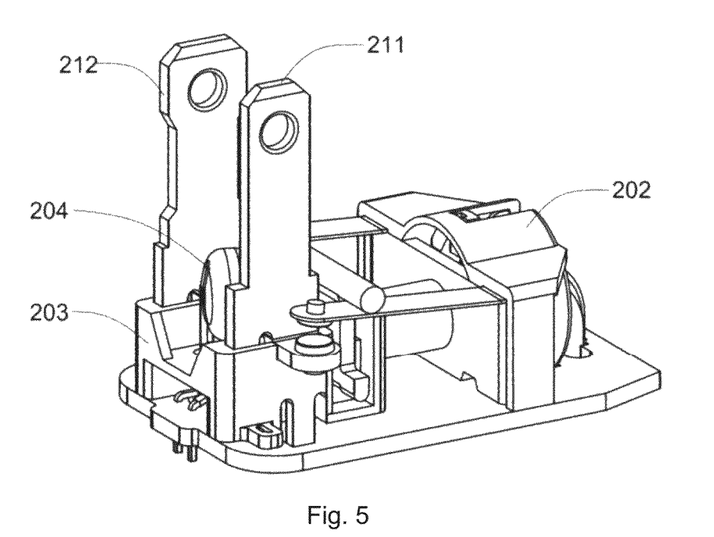
FIG. 5 is another perspective view of the movement assembly.

FIGS. 1-3 illustrates a leakage current protection plug according to a preferred embodiment of the present invention. The leakage current protection plug includes a body formed by a top cover 1 and a base 3. Inside the body, a movement assembly 2, an output cable 4, an input insertion plate 211 for the L (hot) line, an input insertion plate 212 for the N (neutral) line, and output moving contact arms are provided. The output cable 4 has a cable relief 5 that covers a part of it; the cable relief 5 is affixed to a fastening slot 103 of the top cover 1 and a fastening slot 303 of the base 3, to improve bending resistance of the cable. A reset button 11 and a test button 12 are disposed between the top cover 1 and the movement assembly 2. After the various components inside the body have been assembled, the top cover 1 and base 3 are joined together via snaps respectively located on each of them, and fastened together using fasteners such as screws 31. In the illustrated embodiment, the snaps include snap hooks 101, 102 (FIG. 3) on the top cover 1 and snap slots 301, 302 (FIG. 2) on the base 3. The snaps are preferably located at one end of the body, and the fasteners located the other end of the body. It should be understood that the snap slots may be located on the top cover and the snap hooks may be located on the base. The numbers of the snap hooks and snap slots may be one or more. This design can achieve superior assembly quality and reduce assembly time.

The movement assembly of the leakage current protection device of this embodiment is described in detail below. As shown in FIGS. 4-8, and also with reference FIGS. 2 and 3, the movement assembly 2 includes control circuit board PCB 201, and detector assembly 202 and a trip assembly disposed on the PCB 201. The insertion plates 211 and 212 and the output moving contact arms are respectively assembled with the movement assembly 2. More specifically, each output moving contact arm is formed integrally, and is affixed to the detector assembly 202 by snaps. The output terminals of the output moving contact arms are directly coupled to the output cable 4, as will be described in more detail later.

Figure 6:
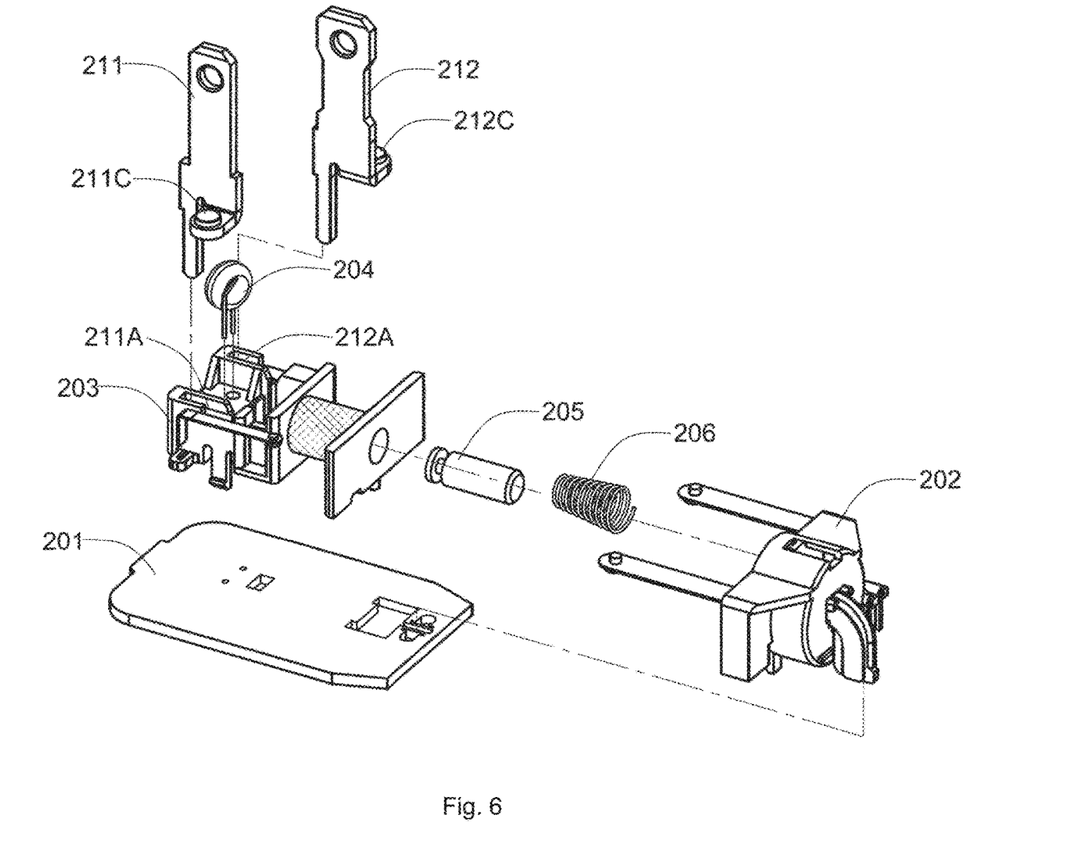
FIG. 6 is an exploded view of the movement assembly of FIGS. 4 and 5.

FIG. 6 illustrates the output insertion plates, the moving assembly and the PCB, and specifically illustrates the structure of the trip assembly. The PCB 201 is provided with slots for affixing the detector assembly 202 and the trip assembly. The trip assembly includes a trip coil frame 203, trip plunger 205 and trip spring 206. One end of the trip coil frame 203 are provided with insertion slots 211A, 212A for accommodating insertion plates 211, 212. The L-line insertion plate 211 and the N-line insertion plate 212 are respectively provided with stationary contact terminals 211C, 212C, and their tail ends are inserted respectively into insertion slots 211A, 212A. The movement assembly may further include a varistor 204, and insertion slots 211A, 212A of the trip coil frame 203 include two pin-receiving holes for the pins of the varistor 204. This way, the L-line insertion plate 211, the N-line insertion plate 212, and the varistor 204 can be fixedly soldered to the PCB 201 via the physical restraint of the trip coil frame.

Figure 7:
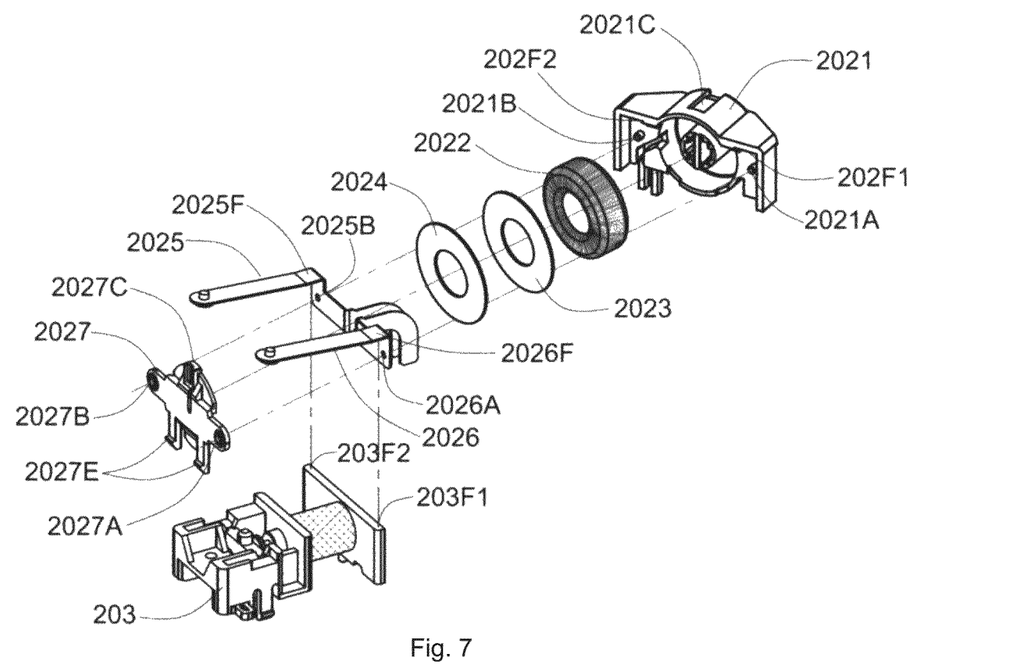
FIG. 7 is an exploded view of the detection assembly.
Figure 8:
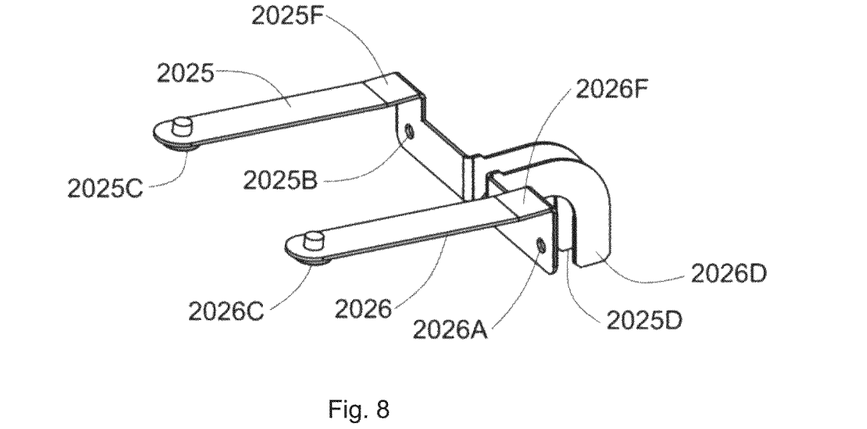
FIG. 8 illustrates the moving contact arms.

Preferably, as shown in FIGS. 7 and 8, in this preferred embodiment, the detector assembly 202 includes a detector coil box 2021, a detector coil 2022 disposed in the detector coil box 2021, and at least one metal plate, for example one metal plate 2023 shown in FIG. 7. It should be understood that two metal plates may be provided on two sides of the detector coil 2022. The detector assembly 202 further includes a detector coil cover 2024 for covering and fixing the detector coil 2022 and metal plate 2023. After the detector coil 2022, metal plate 2023, and detector coil cover 2024 are placed inside the detector coil box 2021, they are affixed to each other by an adhesive. The output moving contact arm 2025 for the N line and the output moving contact arm 2026 for the L line are respectively formed integrally, and have respective moving contact terminals 2025C, 2026C at one ends. The moving contact terminal 2025C and the stationary contact terminal 212C on the N-line insertion plate 212 form a switch for one line, and the moving contact terminal 2026C and the stationary contact terminal 211C on the L-line insertion plate 211 form a switch for the other line. The output moving contact arms 2025, 2026 are respectively provided with output terminals 2025D, 2026D. The detector coil box 2021 has a through hole for allowing the output moving contact arms to pass through, and the output terminals 2025D, 2026D pass though the through holes to be connected to the output cable 4. More specifically, referring to FIG. 3, the N-line output moving contact arm 2025 and the L-line output moving contact arm 2026 pass though the corresponding through holes of the detector coil box 2021, and also respectively pass through the soldering holes 2011, 2012 on the PCB 201. The wire conductors 401, 402 of the output cable 4 also pass through the soldering holes 2011, 2012 on the PCB 201, so that by soldering, the N-line output moving contact arm 2025 and the L-line output moving contact arm 2026 are respectively coupled to the wire conductors 401, 402 of the output cable 4, forming a secure electrical coupling.

It can be seen from FIGS. 7 and 8 that, between the assembly sections of the output moving contact arms and the detector coil box 2021, a positioning structure is provided. In this embodiment, the positioning structure includes a positioning hole 2025B on the N-line output moving contact arm 2025 and a positioning hole 2026A on the L-line output moving contact arm 2026, and positioning posts 2021B, 2021A on the detector coil box 2021. It should be understood that the arrangement of the positioning holes and positioning posts can be exchanged. Preferably, a moving contact cover 2027 may be provided, which can clamp the assembly sections of the output moving contact arms between the cover and the detector coil box 2021. The moving contact cover 2027 has through holes 2027A, 2027B which cooperate with the positioning posts 2021A, 2021B of the detector coil box 2021. Further, the moving contact cover 2027 includes a positioning protrusion 2027C, which can be inserted into a corresponding slot 2021C on the detector coil box 2021. To affixed to the PCB 201, the moving contact cover 2027 may further include positioning hooks 2027E, which can cooperate with corresponding mounting holes on the PCB 201, as shown in FIG. 2. This way, when assembling of the moving assembly, by the cooperation of the positioning holes and positioning posts, by inserting the positioning protrusion 2027C of the moving contact cover 2027 into the corresponding slot 2021C on the detector coil box 2021, and also by inserting the positioning hooks 2027E into corresponding mounting holes on the PCB 201, the relative positions of the various components can be fixed and the components can be effectively assembled.

In a preferred embodiment, the trip coil frame 203 further includes a mounting plate that cooperates with the detector coil box 2021, and the free sections of the output moving contact arms can pass though the position restriction slots on the mounting plate or the detector coil box 2021 to achieve positioning. More specifically, referring to FIGS. 7 and 8, the detector coil box 2021 is provided with a position restriction slot 202F1 which restricts the position of an end portion 2026F which join the free section and the assembly section of the L-line output moving contact arm 2026, and a position restriction slot 202F2 which restricts the position of an end portion 2025F of the N-line output moving contact arm 2025. When the output moving contact arms are assembled in the detector assembly 202 and their output ends pass through the detector assembly 202, the mounting plate of the trip coil frame 203 and the detector coil box 2021 are cooperatively assembled; the vertical direction positioning of the free sections of the output moving contact arms is accomplished by the position restriction slots 202F1, 202F2 and planes 203F1, 203F2 of the trip coil frame 203. It should be understood that the position restriction slots may be provided on the mounting plate; or, both the detector coil box and the mounting plate may be provided with cooperating slots. After completing the above assembling, the trip assembly, with the insertion plates and output moving contact arms assembled with it, and the detector assembly 202 are fixed using the slots of the PCB; the output end of the output moving contact arms are soldered to the output wire conductors of output cable 4; and then the top cover 1 and the base 3 are affixed to each other. This completes the assembly of the leakage current protection plug.

The leakage current protection plug according to embodiments of the present invention has a simple overall structure and can be reliably assembled. By using integrally formed output moving contact arms to directly couple the input and output, it can effectively improve the accuracy of the leakage current detection parameters. At the same time, it reduces internal transfers and solder points of the plug, decrease its size, and greatly reduces its cost.

It will be apparent to those skilled in the art that various modification and variations can be made in the leakage current protection plug and related method of the present invention without departing from the spirit or scope of the invention. Thus, it is intended that the present invention cover modifications and variations that come within the scope of the appended claims and their equivalents.

What is claimed is:

1. A leakage current protection plug comprising:
   a body formed by a top cover and a base;
   a moving assembly disposed in the body, which includes a control circuit board and a detector assembly and a trip assembly disposed on the control circuit board;
   two input insertion plates and two output moving contact arms assembled with the moving assembly; and
   a cable connected to and extending away from the body, the cable including output conductor wires,
   wherein each output moving contact arm is formed integrally and fixed to the detector assembly, and wherein output ends of the output moving contact arms are directly connected to the respective output conductor wires which are parts of the cable
   wherein the trip assembly includes a trip coil frame, a trip plunger, and a trip spring, wherein the trip coil frame defines slots for accommodating the input insertion plates, wherein the movement assembly further includes a varistor, and wherein the trip coil frame further includes pin-receiving holes for receiving pins of the varistor.

2. The leakage current protection plug of claim 1, wherein the top cover and the base are positioned with respect to each other via a snap structure and are fastened to each other by a fastening member, wherein the snap structure includes snap hooks or snap slots on the top cover and corresponding snap slots or snap hooks on the base.

3. The leakage current protection plug of claim 1, further comprising a cable relief which covers a part of the output wires, wherein the cable relief is affixed to a fastening slot of the body.

4. The leakage current protection plug of claim 1, wherein the output ends of the output moving contact arms are directly connected to the respective output conductor wires by soldered structures.

5. A leakage current protection plug comprising:
   a body formed by a top cover and a base;
   a moving assembly disposed in the body, which includes a control circuit board and a detector assembly and a trip assembly disposed on the control circuit board;
   two input insertion plates and two output moving contact arms assembled with the moving assembly; and
   output conductor wires,
   wherein each output moving contact arm is formed integrally and fixed to the detector assembly,
   wherein the detector assembly includes a detector coil box, and a detector coil and at least one metal plate disposed inside the detector coil box, and a detector coil cover which covers and fixes the detector coil and the metal plate, wherein the detector coil box defines a through hole for allowing the output moving contact arms to pass through, and wherein the output ends of the output moving contact arms pass through the through hole and are directly connected to the respective output conductor wires.

6. The leakage current protection plug of claim 5, wherein the detector coil box, the detector coil, the metal plate, and the detector coil cover are affixed to each other by an adhesive.

7. The leakage current protection plug of claim 5, further comprising a positioning structure for the output moving contact arms and the detector coil box, the positioning structure including a positioning hole or a positioning post on an assembly section of each output moving contact arm, and corresponding positioning posts or positioning holes on the detector coil box.

8. The leakage current protection plug of claim 7, further comprising a moving contact cover for clamping the assembly sections of the output moving contact arms between the moving contact cover and the detector coil box, wherein the moving contact cover includes through holes which cooperate with the positioning posts of the detector coil box, and includes a positioning protrusion which is inserted into a corresponding slot on the detector coil box.

9. The leakage current protection plug of claim 8, wherein the moving contact cover further includes positioning hooks which are inserted into corresponding mounting holes on the control circuit board.

10. The leakage current protection plug of claim 5, wherein the trip assembly includes a trip coil frame, a trip plunger, and a trip spring, wherein the trip coil frame defines slots for accommodating the input insertion plates.

11. The leakage current protection plug of claim 10, wherein the trip coil frame further includes a mounting plate cooperating with the detector coil box, wherein free sections of the output moving contact arms pass though position restriction slots on the mounting plate or the detector coil box.

12. A leakage current protection plug comprising:
   a body formed by a top cover and a base;
   a moving assembly disposed in the body, which includes a control circuit board and a detector assembly and a trip assembly disposed on the control circuit board;
   two input insertion plates and two output moving contact arms assembled with the moving assembly; and
   output conductor wires,
   wherein each output moving contact arm is formed integrally and fixed to the detector assembly, and wherein output ends of the output moving contact arms are directly connected to the respective output conductor wires,
   wherein the trip assembly includes a trip coil frame, a trip plunger, and a trip spring, wherein the trip coil frame defines slots for accommodating the input insertion plates, wherein the trip coil frame further includes a mounting plate cooperating with the detector coil box, wherein free sections of the output moving contact arms pass though position restriction slots on the mounting plate or the detector coil box.

\* \* \* \* \*